US012583672B2

(12) United States Patent
Matikainen et al.

(10) Patent No.: US 12,583,672 B2
(45) Date of Patent: Mar. 24, 2026

(54) MULTI-LEVEL CONTAINER STORAGE SYSTEM AND HIGH-BAY CONTAINER STORAGE

(71) Applicant: PESMEL OY, Kauhajoki (FI)

(72) Inventors: Jani Matikainen, Kauhajoki (FI);
Jouni Piirto, Kauhajoki (FI)

(73) Assignee: PESMEL OY, Kauhajoki (FI)

( * ) Notice: Subject to any disclaimer, the term of this patent is extended or adjusted under 35 U.S.C. 154(b) by 132 days.

(21) Appl. No.: 18/252,136

(22) PCT Filed: Nov. 9, 2020

(86) PCT No.: PCT/FI2020/050740
§ 371 (c)(1),
(2) Date: May 8, 2023

(87) PCT Pub. No.: WO2022/096773
PCT Pub. Date: May 12, 2022

(65) Prior Publication Data
US 2023/0399170 A1     Dec. 14, 2023

(51) Int. Cl.
B65G 1/04          (2006.01)
B65G 63/00         (2006.01)

(52) U.S. Cl.
CPC ......... B65G 1/0414 (2013.01); B65G 1/0435 (2013.01); B65G 63/004 (2013.01)

(58) Field of Classification Search
CPC ........................... B65G 1/0414; B65G 1/0435
See application file for complete search history.

(56) References Cited

U.S. PATENT DOCUMENTS 3,779,403  A  *  12/1973  Young ....................... B66F 9/07
                                                        414/281
2020/0207557 A1*  7/2020  Lydle ................... B65G 63/065
                         (Continued)

FOREIGN PATENT DOCUMENTS

JP          S5895005  A     6/1983
JP          H01203105 A     8/1989
                 (Continued)

OTHER PUBLICATIONS

International Search Report for PCT/FI2020/050740, dated Jul. 27, 2021, 3 pages.
                         (Continued)

*Primary Examiner* — Kaitlin S Joerger
(74) *Attorney, Agent, or Firm* — NIXON & VANDERHYE

(57)          ABSTRACT
Disclosed is a multi-level container storage system including a storage module including racks for storing containers, and a high-bay container storage. At least two tracks arranged in a first distance from each other in the vertical direction. The system includes a container handling apparatus capable of moving at least one container in three directions. The container handling apparatus includes a stacker crane including a carrier support for a carrier device of the container handling apparatus. The carrier device includes a handling mechanism for gripping, lifting, lowering, and releasing at least one container and is arranged to be moved out of and into the stacker crane, and into and out of the storage module, respectively, along one of the tracks of a rack, wherein the handling mechanism is arranged to move at least one container at most the first distance.

19 Claims, 9 Drawing Sheets

(56)        References Cited

U.S. PATENT DOCUMENTS

| | | | | |
|---|---|---|---|---|
| 2021/0047114 A1* | 2/2021 | Heide | .................. | B65G 1/0407 |
| 2021/0188572 A1* | 6/2021 | Heide | .................. | B65G 1/0485 |
| 2023/0002175 A1* | 1/2023 | Van Der Meer | ..... | B65G 1/0485 |
| 2023/0159272 A1* | 5/2023 | Cannon | .................. | B66C 17/20 |
| | | | | 414/277 |

FOREIGN PATENT DOCUMENTS

| | | | |
|---|---|---|---|
| JP | H1045215 A | 2/1998 |
| KR | 20190055215 A | 5/2019 |
| WO | 2018060527 A1 | 4/2018 |

OTHER PUBLICATIONS

Written Opinion of the ISA for PCT/FI2020/050740, dated Jul. 27, 2021, 8 pages.
Office Action, issued in Korean Patent Application No. 10-2023-7019519 dated May 14, 2025.

* cited by examiner

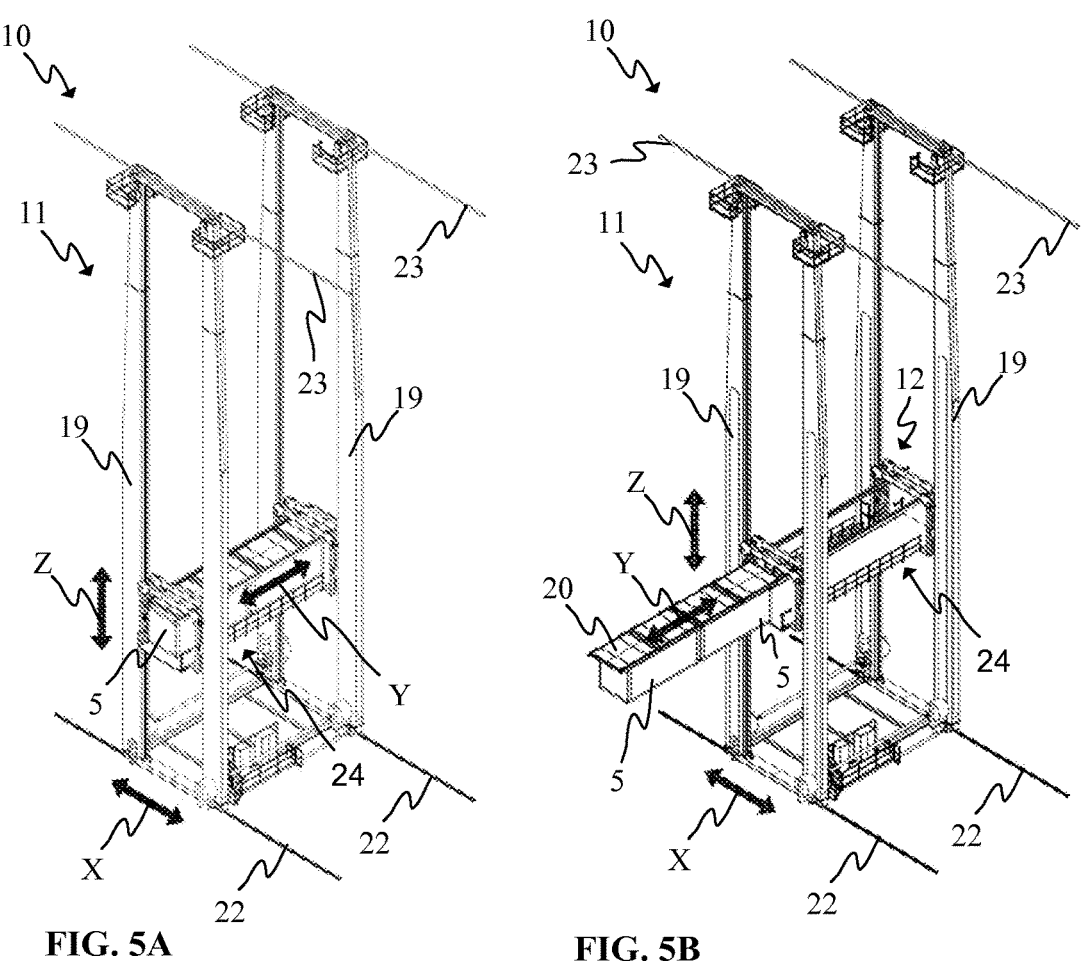
FIG. 5A
FIG. 5B
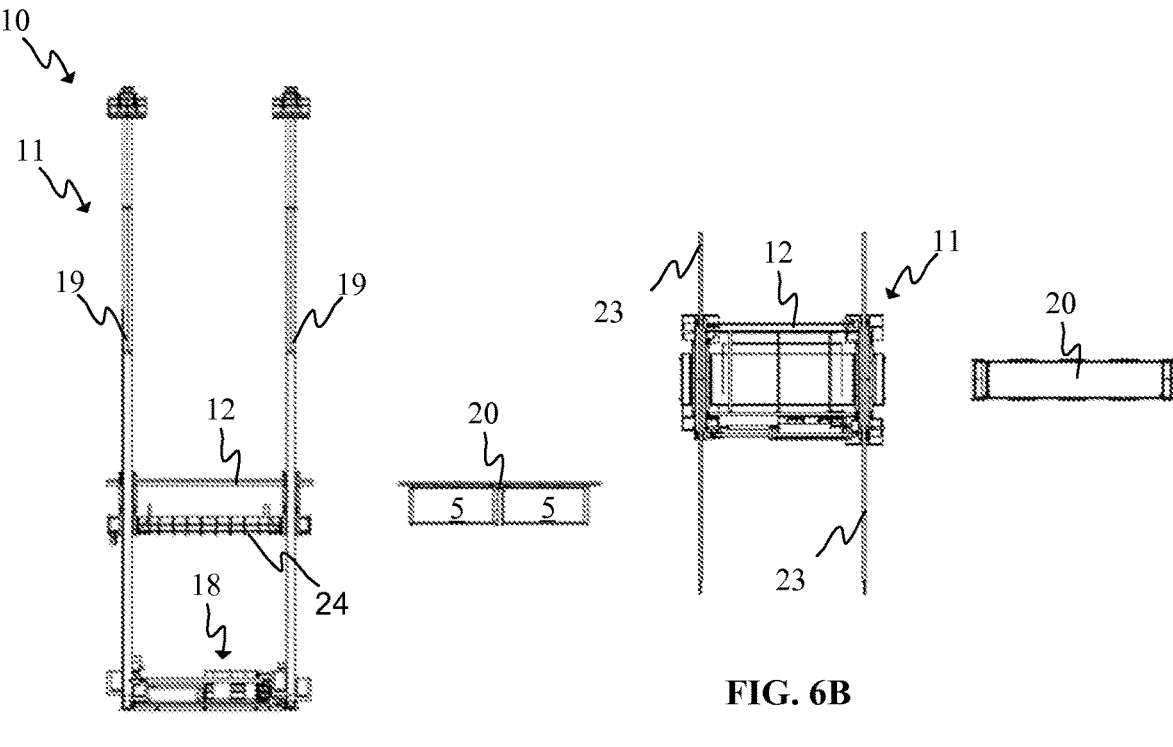
FIG. 6A
FIG. 6B

MULTI-LEVEL CONTAINER STORAGE SYSTEM AND HIGH-BAY CONTAINER STORAGE

CROSS-REFERENCE TO RELATED APPLICATION

This application is the U.S. national phase of International Application No. PCT/FI2020/050740 filed Nov. 9, 2020, which designated the U.S., the entire contents of which are hereby incorporated by reference.

FIELD OF THE INVENTION

The present invention relates in general to container storages. In particular, however not exclusively, the present invention concerns multi-level container storage systems and high-bay container storages or warehouses comprising such storage systems.

BACKGROUND

It is known to stack containers on top of each other, for example, in container terminals and container ships. In this case, retrieving one of the containers which is not the topmost container is difficult since the container on top must first be moved away. Furthermore, if a container from the stack surrounded by other stacks is to be retrieved, it can become complicated. It is furthermore known to utilize container storage in which containers can be stored in multiple levels, such as in plurality of shelves arranged in several level in the vertical direction. In known attempts, the retrieving of the containers by the crane of the system is slow.

SUMMARY

An objective of the present invention is to provide a multi-level container storage system and a high-bay container storage. Another objective of the present invention is that the multi-level container storage system and the high-bay container storage provide space-efficient storing of containers with fast and accurate storing and retrieving capabilities.

The objectives of the invention are reached by a multi-level container storage system and a high-bay container storage as defined by the respective independent claims.

According to a first aspect, a multi-level container storage system is provided. The multi-level container storage system comprises a storage module comprising racks in a vertical direction and a first horizontal direction for storing containers, wherein each one of the racks comprises a support for supporting at least one container and at least two first tracks arranged in a first distance from each other in the vertical direction and extending in a second horizontal direction, the second horizontal direction being perpendicular relative to the first horizontal direction, and at least one of the racks is adapted for receiving a plurality of containers stackable on top of each other.

The multi-level container storage system further comprises a container handling apparatus capable of moving at least one container in the vertical, first horizontal, and second horizontal directions.

The container handling apparatus comprises a stacker crane comprises a carrier support for a carrier device of the container handling apparatus and is arranged to be moved in the first horizontal direction and capable of moving the carrier support in the vertical direction, and the carrier device comprising a handling mechanism for gripping, lifting, lowering, and releasing at least one container, wherein the carrier device is arrange to be moved out of and into the stacker crane, and into and out of the storage module, respectively, along one of the tracks of a rack for storing and retrieving at least one container to or from the storage module, wherein the handling mechanism is arranged to move at least one container at most the first distance, or optionally at most a half of the first distance, in the vertical direction when lowering and/or lifting the container. In some embodiments, the handling mechanism may be arranged to move at least one container at most a distance in the range of 100-300 millimeters, preferably in the range of 100-200 millimeters.

In some embodiments, the maximum range of motion of the container in the vertical direction provided by the handling mechanism may be less than 50 percent of the first distance, or even less than 20 or 15 percent of the first distance.

Alternatively or in addition, the dimension of the carrier device in the vertical direction may be in the range of 100-300 millimeters. Thus, the first distance, preferably, be about a height of a container to be stored plus said dimension of the carrier device and, optionally, about the maximum range of motion of the container in the vertical direction.

The racks may be dimensioned, for example, for storing one or more containers having a length of about 6.1 meters, about 12.2 meters, about 14.6 meters, or about 16.2 meters.

Furthermore, at least one of the racks may be arranged to store consecutively at least two containers in the second horizontal direction.

In addition, the multi-level container storage system may comprise a further storage module arranged on opposite side of the stacker crane in the second horizontal direction. In various embodiments, the carrier device may be further arranged to be moved out of and into the stacker crane, and into and out of the further storage module, respectively, along one of the first tracks of a rack of the further storage module.

In preferable embodiments, the carrier device may be arranged to move at least one container into and out of the storage module in a longitudinal direction of the at least one container.

In various preferable embodiments, the handling mechanism may be rigid, such as ropeless. Therefore, in many embodiments, the carrier device is not a crane which utilizes a hoist rope, wire ropes, and/or chains, or the like, for lowering and lifting the container. Thus, in various embodiments, the lowering and lifting of the container is accurate and fast because the container does not move or can move only insignificant amount, such as few millimeters up to one or two centimeters in other directions when being lowered or lifted.

In various embodiments, the first distance may be at least a height or more than the height of a container, such as up to two times the height.

In various embodiments, the support and the lowest track in the vertical direction may be arranged to have a second distance between them, the second distance being at least a height or more than the height of a container, such as up to two times the height.

Furthermore, the stacker crane may be arranged to be moved in the first horizontal direction along a second track extending the first horizontal direction.

Alternatively or in addition, the stacker crane may be arranged to move the carrier support in the vertical direction along vertical beams of the stacker crane by, for example, a hoisting rope(s) or the like. There may thus be hoisting rope or ropes for moving the carrier support in the vertical direction arranged to extend on the side(s) and/or inside the beam(s). There can also be sheaves for the hoisting rope(s) arranged at one end or both ends of the beam(s).

The multi-level container storage system may further comprise a loading/unloading facility. Furthermore, the container handling apparatus may be further arranged to be moved into the loading/unloading facility for retrieving a container from the loading/unloading facility. For example, the second track may extend into the loading/unloading facility for moving the container handling apparatus into and out of the loading/unloading facility.

According to a second aspect, a high-bay container storage is provided. The high-bay container storage comprises at least one multi-level container storage system in accordance with the first aspect, and at least one building element, such as a foundation, a roof and/or walls, at least partly surrounding the at least one multi-level container storage system.

Furthermore, the high-bay container storage may comprise a plurality of said multi-level container storage systems.

The present invention provides a multi-level container storage system and a high-bay container storage. The present invention provides advantages over known solutions in that it provides space-efficient storing of containers with fast and accurate storing and retrieving capabilities.

Various other advantages will become clear to a skilled person based on the following detailed description.

The expression "a plurality of" may refer to any positive integer starting from two (2), that is being at least two.

The terms "first", "second", etc. are herein used to distinguish one element from another element, and not to specially prioritize or order them, if not otherwise explicitly stated.

The exemplary embodiments presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the present invention are illustrated by way of example, and not by way of limitation, in the figures of the accompanying drawings.

FIGS. 5A and 5B illustrate schematically a container handling apparatus according to an embodiment.

FIGS. 6A and 6B illustrate schematically a container handling apparatus according to an embodiment.

DETAILED DESCRIPTION OF SOME
EMBODIMENTS

Figure 1A:
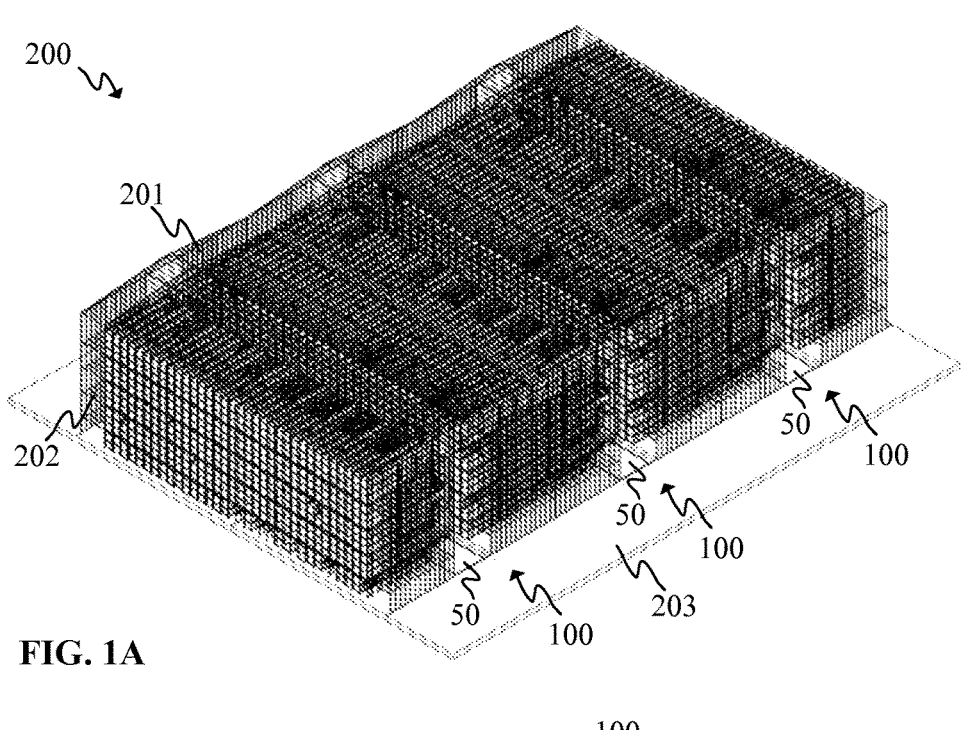
FIGS. 1A-1C illustrate schematically a high-bay container storage according to an embodiment.
Figure 1B:
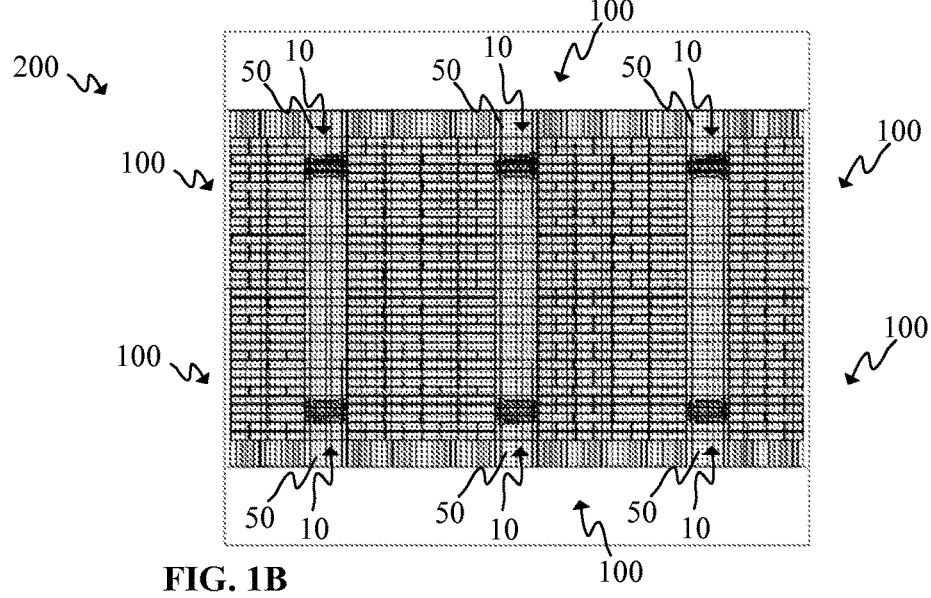
Figure 1C:
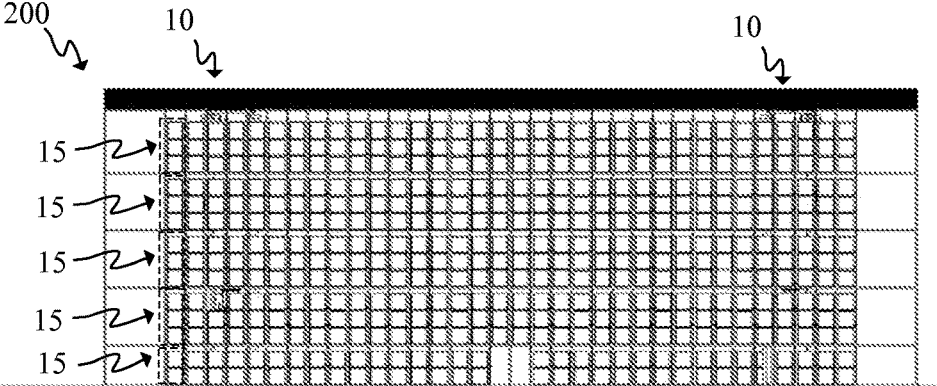

FIGS. 1A-1C illustrate schematically a high-bay container storage 200 according to an embodiment. The high-bay container storage 200 according to various embodiments is intended to be used for storing containers 5, such as intermodal, or ship-ping or cargo or ISO or sea or ocean, containers.

FIG. 1A illustrates schematically the high-bay container storage 200 from a perspective, FIG. 1B from above or below, and FIG. 1C as a cross-sectional view from one side. The high-bay container storage 200 comprises at least one building element, such as a roof 201 and/or walls 202, at least partly surrounding at least one multi-level container storage system 100 comprised in the high-bay container storage 200. In FIGS. 1A-1C, only structures for supporting the roof 201 and the walls 202 are being shown. Furthermore, the high-bay container storage 200, preferably, comprises a foundation 203. In FIG. 1A, the high-bay container storage 200 is shown to comprise six multi-level container storage systems 100, each comprising at least one storage module comprising racks 15 for storing containers 5 and a container handling apparatus 10 for moving containers 5 into and out of the racks 15.

In some embodiments, the high-bay container storage 200 may comprise a loading/unloading facility 50, wherein the container handling apparatus 10 is further arranged to be moved into the loading/unloading facility 50 for retrieving a container 5 from the loading/unloading facility 50. Furthermore, the container handling apparatus 10 may be arranged to be moved along second track extending into the loading/unloading facility 50.

Figures 2, 3A:
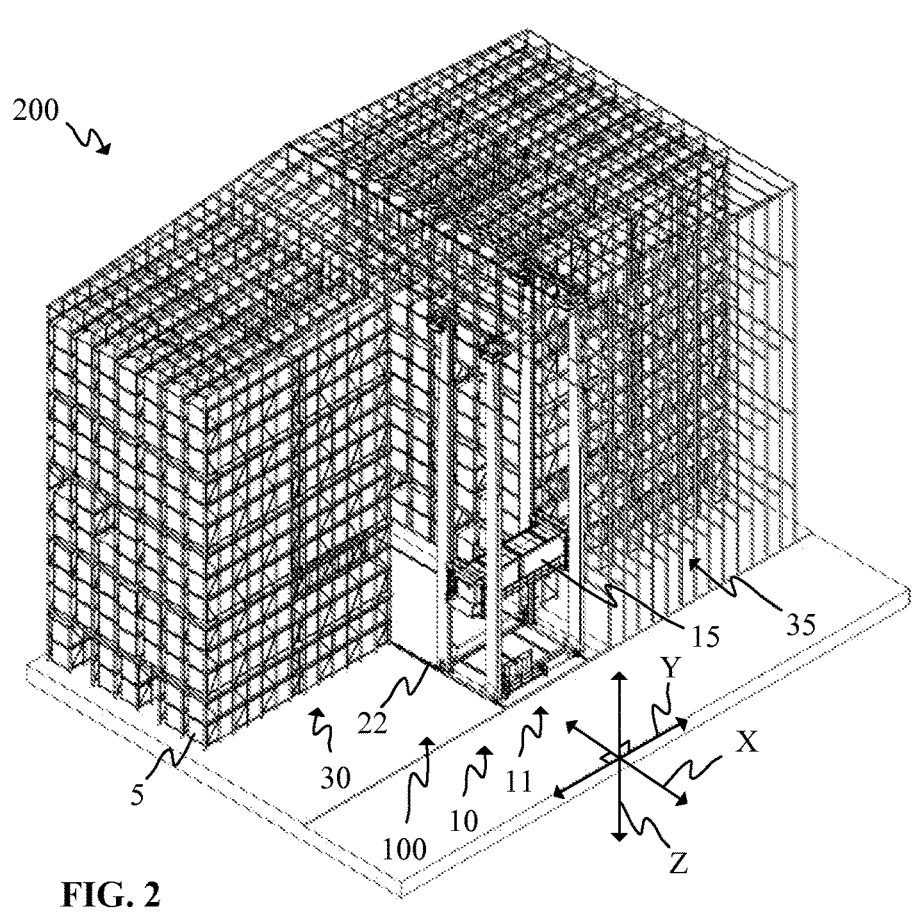
FIG. 2 illustrates schematically a high-bay container storage according to an embodiment.
FIGS. 3A and 3B illustrate schematically a high-bay container storage according to an embodiment.

FIG. 2 illustrates schematically a high-bay container storage 200 according to an embodiment. The high-bay container storage 200 of FIG. 2 may be essentially similar to the one illustrated in FIGS. 1A-1C. In FIG. 2, the container handling apparatus 10 is loaded with two containers 5, such as 20-foot containers. Furthermore, FIG. 2 illustrates a second track 22, such as including two parallel rails, extending on surface of the foundation 203. The second track 22 extends, preferably, in a first horizontal direction X. The storage module 30 in accordance with various embodiments comprises racks 15 in a vertical direction Z and a first horizontal direction Y for storing containers 5. Thus, the container handling apparatus 10 is arranged to move containers 5 into and out of the racks 15 of the storage module 30.

In various embodiments, the multi-level container storage system 100 may additionally comprise a further storage module 35 arranged on opposite side of the stacker crane 11 in the second horizontal direction Y. Furthermore, the container handling apparatus 10 may, preferably, further be arranged to move containers 5 into and out of the racks 15 of the further storage module 35. As can be understood based on FIGS. 1A-2, the further storage module 35 may be substantially similar with respect to the storage module 30, however, not necessarily.

Figures 3B, 4A, 4B:
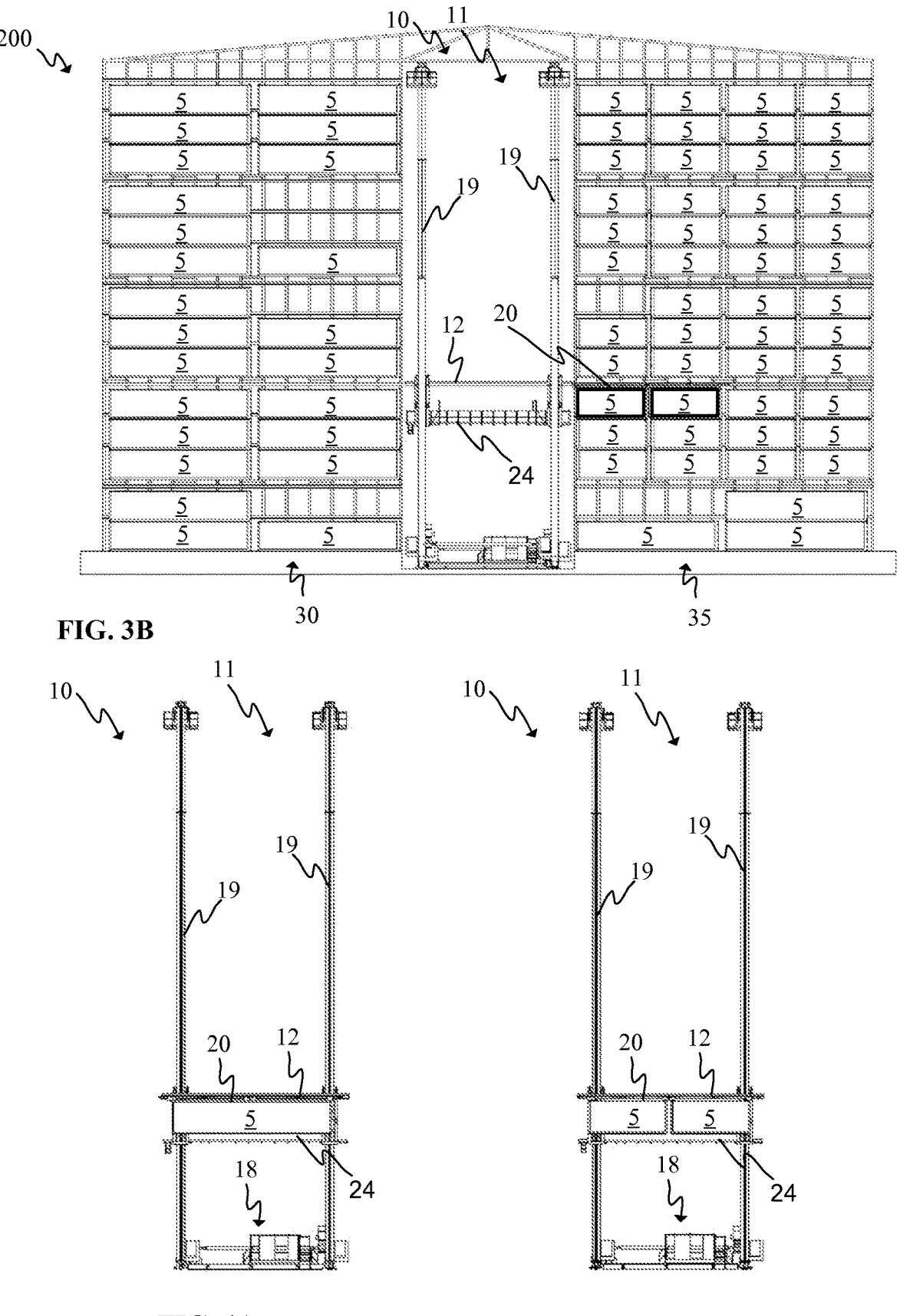
FIGS. 4A and 4B illustrate schematically container handling apparatuses according to some embodiments.

FIGS. 3A and 3B illustrate schematically a high-bay container storage 200 according to an embodiment. FIGS. 3A and 3B are cross-sectional views of the storage 200. The high-bay container storage 200 comprises at least one multi-level container storage system 100. The at least one multi-level container storage system 100 comprises the storage module 30, and optionally the further storage module 35, comprising racks in a vertical direction Z and a first horizontal direction X for storing containers 5. Each one of the racks 15 comprises a support for supporting at least one container 5 and at least two first tracks (not shown in FIGS. 3A and 3B) arranged in a first distance from each other in the vertical direction Z and extending in a second horizontal direction Y. Furthermore, at least one, or several, or even each one of the racks 15 is adapted for receiving a plurality of containers 5 stackable on top of each other. Still further, the at least one multi-level container storage system 100 comprises the container handling apparatus 10 capable of moving at least one container 5 in the vertical Z, first horizontal X, and second horizontal directions Y. In preferable embodiments, the container handling apparatus 10 is arranged to be capable of moving at least one container 5 simultaneously in the vertical Z and the first horizontal direction X.

The container handling apparatus 10 comprises a stacker crane 11 comprising a carrier support 12 for a carrier device 20 of the container handling apparatus 10 and is arranged to be moved in the first horizontal direction X and capable of moving the carrier support 12 in the vertical direction Z, preferably simultaneously, wherein the stacker crane 11. There may be hoisting rope or ropes for moving the carrier support 12 in the vertical direction Z arranged to extend on the side(s) and/or inside the beam(s). There can also be sheaves for the hoisting rope(s) arranged at one end or both ends of the beam(s).

The carrier device 20 comprises a handling mechanism for gripping, lifting and lowering, and releasing at least one container 5. The carrier device 20 is arrange to be moved out of and into the stacker crane 11, and into and out of the storage module respectively, that is, the carrier device 20 is arranged to be detachable with respect to the carrier support 12. The movement of the carrier device 20 is arranged to be along one of the first tracks of a rack 15 for storing and retrieving at least one container 5 to or from the storage module 30 (and optionally further storage module 35), wherein the handling mechanism is arranged to move at least one container at most the first distance.

In FIG. 3A, the carrier device 20 is carrying two containers 5, such as 20-foot containers. In some embodiments, there could be only one container 5 such as a 40-foot container. The carrier device 20, and especially the handling mechanism thereof, may be arranged to be able to carry either one longer container, such as a 40-foot container, or two shorter containers, such as 20-foot containers. The carrier device 20 is, in FIG. 3A, at the stacker crane 11, that is, engaged with the carrier support 12, such as track or rail portions thereof.

In FIG. 3B, the carrier device 20 has been detached from the carrier support 12 for moving the container(s) 5 into the rack 15 of the further storage module 35. The carrier device 20 is thus moving along the first tracks (not visible in FIGS. 3A and 3B) of the rack 15 in question.

FIG. 3B further illustrates an optional container support 24 of the stacker crane 11. This may also apply to the embodiments illustrated in FIGS. 1A-3A, 4A-7, and 9A-9B. The container support 24 may be utilized to store thereon a container 5, or in some embodiments even two or three containers 5, on top of each other even if there is currently no carrier device 20 being arranged to the stacker crane 11. Thus, additionally, the stacker crane 11 may be arranged to move container(s) 5 even without any carrier device 20 being arranged thereto. In these embodiments, the carrier device 20 may preferably be completely detachable with respect to the stacker crane 11 as is being described hereinbelow in connection to FIGS. 6A and 6B.

As can be seen in FIGS. 1-3B, at least one or several or even each one of the racks 15 may be arranged to store consecutively at least two containers 5 in the second horizontal direction Y. Furthermore, the carrier device 20 is preferably arranged to be able to move along the first tracks of the rack 15 so that it is capable of moving containers so that they may be stored in the rack 15 consecutively.

FIGS. 4A and 4B illustrate schematically container handling apparatuses 10 according to some embodiments. FIG. 4A illustrates a container handling apparatus which carrier device 20 is adapted to carry one container 5. FIG. 4B illustrates a container handling apparatus 10 which carrier device 20 is arranged to carry two containers 5. However, as will be described hereinbelow, the carrier device 20 in accordance with various embodiments may be arranged to be able to carry either one longer container 5, or one or two shorter containers 5.

In various embodiments, such as illustrated in FIGS. 2-4B, the stacker crane 11 may be arranged to move the carrier support 12 in the vertical direction Z along vertical beams 19 of the stacker crane 11. The stacker crane 11 may, thus, be arranged to be moved along the second track 22 extending at the first, or lower, ends of the vertical beams 19. There may, optionally, be further second track extending at the second, or top, ends of the vertical beams 19. Thus, individual vertical beams 19 may be supported by at least two different points, preferably, at the bottom and at the top ends thereof.

Furthermore, the stacker crane 11 preferably comprises motion control equipment 18. The motion control equipment 18 may be, for example, arranged close to the lower end of the stacker crane 11. The motion control equipment 18 may comprise at least one motor which is arranged to cause movement of the stacker crane 11 along the second track 22. Furthermore, motion control equipment 18 may also be configured to move the carrier support 12 in the vertical direction Z. The motion control equipment 18 may comprise a stacker crane controller for controlling the operation of the stacker crane 11, however, the stacker crane controller may, alternatively or in addition, be arranged some other place or places than at the motion control equipment 18.

FIGS. 5A and 5B illustrate schematically a container handling apparatus 10 according to an embodiment. FIGS. 5A and 5B show the container handling apparatus by perspective views. As is visible in FIGS. 5A and 5B, marked with two-headed arrows, the container handling apparatus 10 is arranged to move at least one container in this case two containers 5 in three substantially orthogonal directions, namely vertical Z, first horizontal X, and second horizontal Y. The container 5 may be moved into the first horizontal direction X by moving the stacker crane 11, for example, along the second track 22, and optionally the further second track 23 as shown in FIGS. 5A and 5B, by rollers or wheels, or alternatively, by other means, such as by having tires or the like. Furthermore, the stacker crane 11 may be arranged to move the carrier support 12 in the vertical direction Z in order to move the container(s) 5. Finally, the carrier device 20 is preferably arranged to move in the second horizontal direction Y with respect to the stacker crane 11.

FIGS. 6A and 6B illustrate schematically a container handling apparatus according to an embodiment. The container handling apparatus 10 is substantially similar to the ones illustrated in FIGS. 4A-5B and as being described in connection thereto, however, FIGS. 6A and 6B further illustrate that the carrier device 20 may be completely detached from the carrier support 12 of the stacker crane 11 so that the carrier device 20 is not supported at all by the carrier support 12 but by the first track of a rack 15 of the storage module 30. It is to be understood that there may, however, still be, for example, electrical and/or communication connections, such as for controlling the operation of the carrier device 20, extending between the stacker crane 11 and the carrier device 20 even if the carrier device 20 is completely detached from the carrier support 12. FIGS. 6A and 6B clearly illustrates this complete detachment. In various embodiments, however, the carrier device 20 may be completely detachable in the sense that communication connections are wireless, if any, and electrical power is being provided by an energy storage, such as a battery (bank) or batteries, on the carrier device 20. Alternatively or in addition, electrical power may be provided to operate the carrier device 20 via contact(s) in the racks 15, such as in connection to the first tracks 17, 17B thereof. Thus, the carrier device 20 may be controlled independently of the stacker crane 10. The stacker crane 10 may, for example, move a first carrier device 20 to a position in which it enters the storage module 30 and then move out of the position to retrieve a second carrier device 20.

Figure 7:
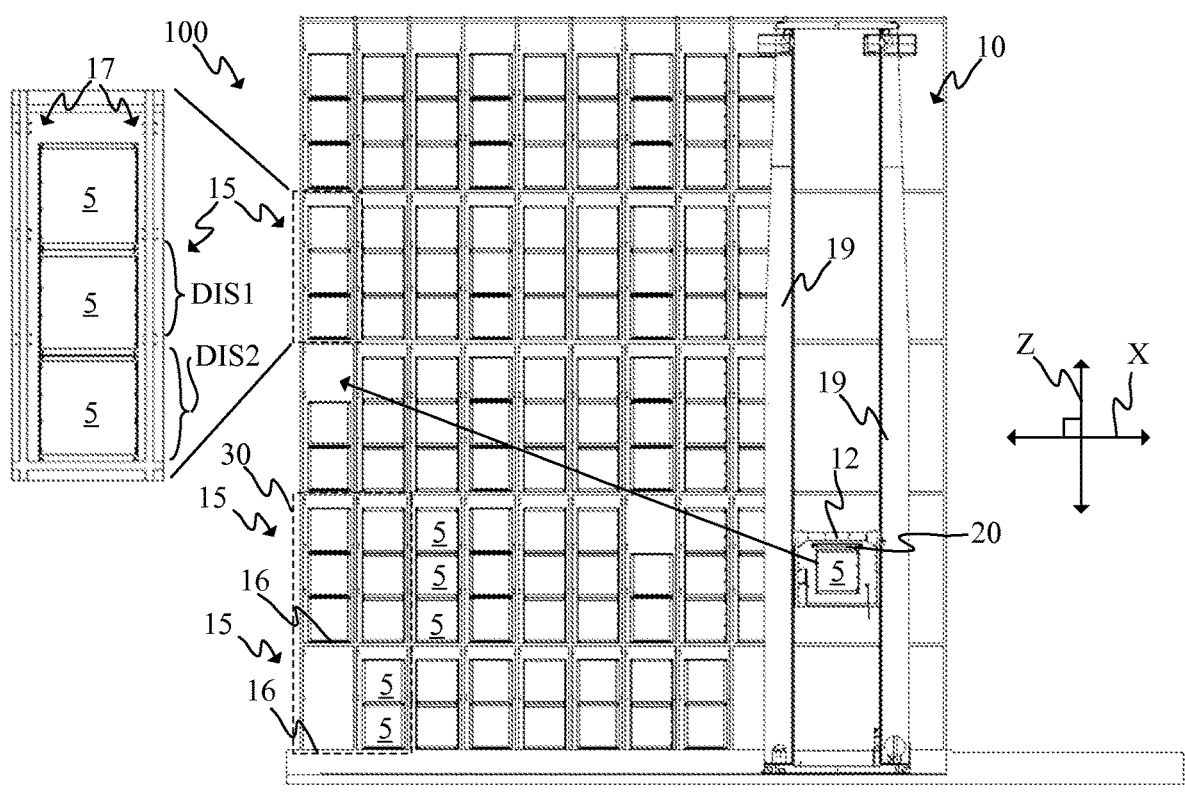
FIG. 7 illustrate schematically a multi-level container storage system according to some embodiments.

FIG. 7 illustrate schematically a multi-level container storage system 100 according to some embodiments. Reference sign 5 has only been marked for some of the containers 5. As visible in FIG. 7, the storage module 30 comprises racks 15 in the vertical direction Z and a first horizontal direction X for storing containers 5. Even though it is shown that the storage module 30 comprises only four racks 15, it might as well be that the storage module 30 comprises each one of the racks 15 in FIG. 7. FIG. 7 illustrates, by the arrow having the starting point thereof at the container 5 in the stacker crane 11, one example of moving the container 5 simultaneously in the vertical direction Z and the first horizontal direction X by the container handling apparatus 10. The arrow, thus, may depict the actual path of the container 5 in question, which the path is more or less a direct displacement having the shortest possible distance between the current position of the container 5 and the storage position thereof in the destination rack 15.

Each one of the racks 15 comprises a support 16 for supporting at least one container 5 and at least two first tracks 17 arranged in a first distance DIS1 from each other in the vertical direction Z and extending in a second horizontal direction Y. In various embodiments, the first distance DIS1 may be at least a height or more than the height of a container 5. Furthermore, the support 16 and the lowest first track 17 in the vertical direction Z may be arranged to have a second distance DIS2 between them, the second distance DIS2 being at least a height or more than the height of a container 5. As can be seen, the racks 15 are adapted for receiving a plurality of containers 5 stackable on top of each other, that is, one rack 15 may be utilized to store more than one container 5. The bottom-most container 5 in the racks 15 is supported by the support 16. On the left in FIG. 7, one of the racks 15 is shown enlarged so that the first tracks 17 can easily be seen. The first tracks 17 may be, for example, rails. The first tracks 17 may, in some embodiments, substantially correspond to the track or rail portions of the carrier support 12, however, not necessarily.

In accordance with some embodiments, FIG. 7 illustrates that the dimensions, such as the height, of the racks 15 of the storage module 30 with respect to each other may be the same or different (see the bottom-most racks 15 accommodating two containers 5 in comparison to the second bottom-most racks 15 accommodating three containers 5).

Figure 8:
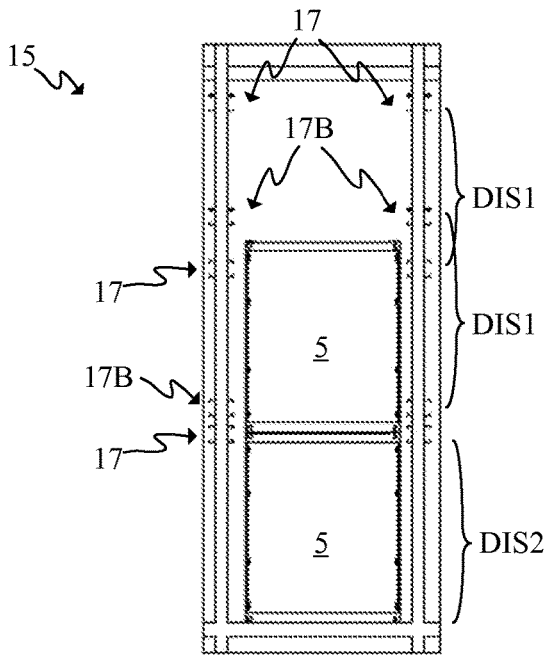
FIG. 8 illustrates schematically a rack of a multi-level container storage system according to an embodiment.

FIG. 8 illustrates schematically a rack 15 of a multi-level container storage system 10 according to an embodiment. In this case, the racks 15 comprise at least two sets of tracks, namely first tracks 17 and further first tracks 17B, which may preferably be similar kinds of tracks, if not identical. The first tracks 17, having therebetween the first distances DIS1, may be utilized to store, in this case, three containers 5 having a first height. However, the same rack 15, which comprises further first tracks 17B and the first distance DIS1 therebetween, may alternatively be utilized to store, in this case, two containers 5 having a second height. The first distance DIS1 is, thus, defined between two consecutive tracks of the same set of tracks. The containers 5 having the second height are higher than the containers 5 having the first height. Thus, the rack 15 may be utilized selectively to store two types of containers 5 which the type relates at least to the height of the container 5.

Figure 9A:
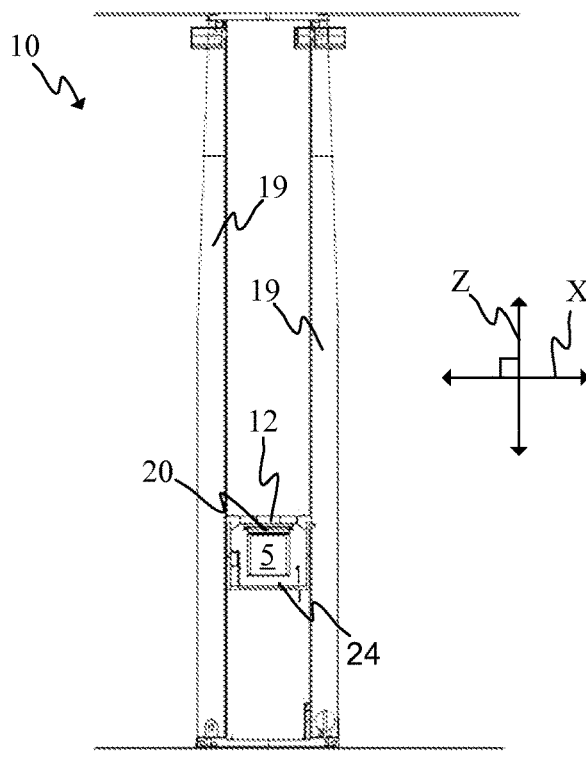
FIGS. 9A and 9B illustrate schematically container handling apparatuses according to some embodiments.
Figure 9B:
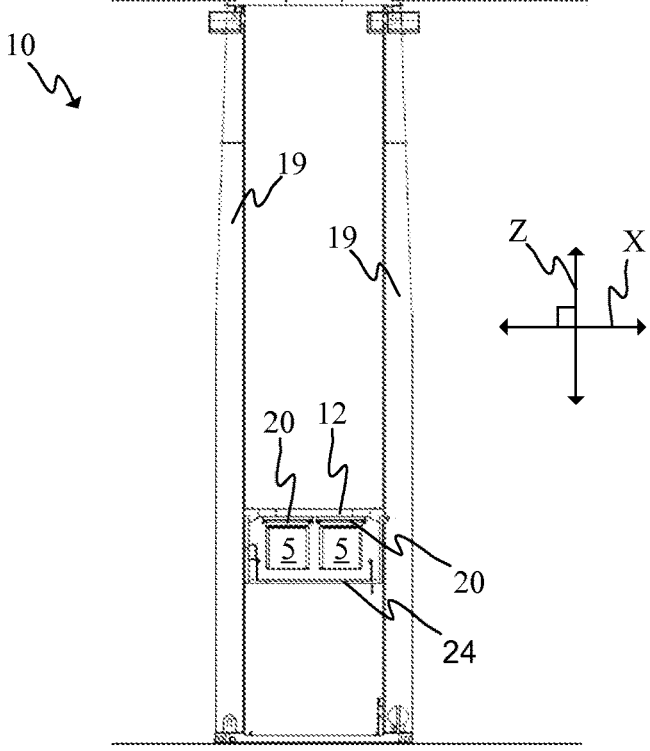

FIGS. 9A and 9B illustrate schematically container handling apparatuses 10 according to some embodiments. In FIG. 9A, the container handling apparatus 10 is substantially similar to the ones described hereinbefore, for example, in connection to and being illustrated in FIGS. 5A-7. However, FIG. 9B illustrates a container handling apparatus 10 which carrier support 12 is adapted for supporting two carrier devices 20. Said two carrier devices 20 may be independently movable and controllable. In some other embodiments, however, there may be only one carrier device 20 which is arranged to carry at least two containers 5 in parallel in the first horizontal direction X. The racks 15 may thus need to be adapted based on the dimensions and type of the carrier device 20.

Figure 10A:
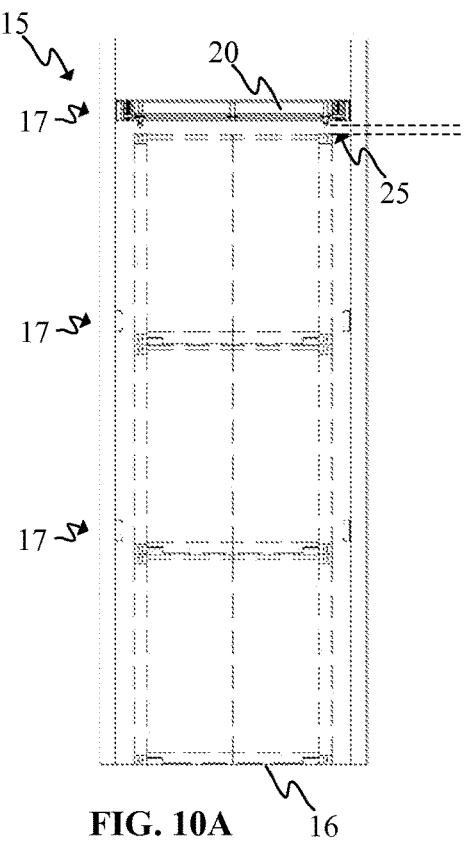
FIGS. 10A-10D show some operating phases of a container handling apparatus according to an embodiment.
Figure 10B:
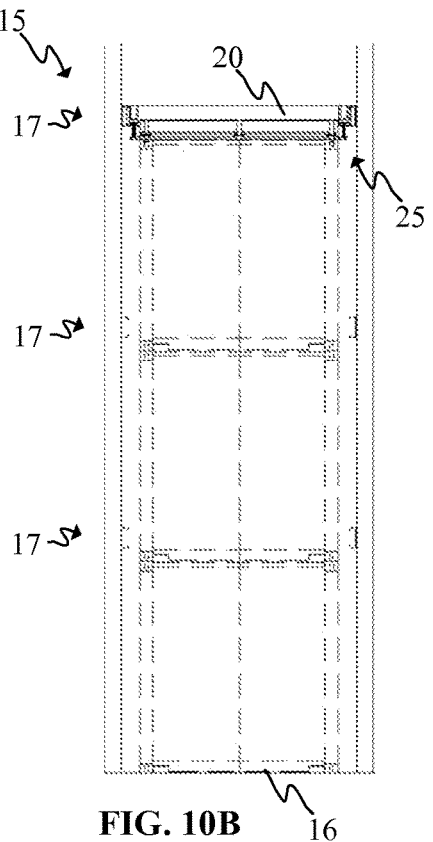

FIGS. 10A-10D show some operating phases of a container handling apparatus 10, especially the carrier device 20 thereof, according to an embodiment. In FIG. 10A, the carrier device 20 is arranged to a position above the topmost container 5 in the rack 15 in question. Thus, the carrier device 20 has been moved along the corresponding first track 17 to the position. In this case, the first track 17 in question is the third track from the bottom. FIG. 10B illustrates the operation of the handling mechanism 25 when it is arranged to lower towards the container 5. The handling mechanism 25 is being lowered towards the container 5 to a position where gripping is possible.

In various embodiments, the handling mechanism 25 may be lowered by utilizing a rigid mechanism, such as being ropeless. The rigid lowering-and-lifting mechanism may be implemented, for example, by one or several gears, and toothed bars or gear tracks. According to another embodiments, alternatively or in addition, a scissor lift type of mechanism may be utilized to provide motion for lowering and lifting of the handling mechanism. The nature of the rigidity of the handling mechanism 25 does relates to, for example, not utilizing a hoisting rope or the like which would cause swinging of the container 5 during moving thereof, for example, when utilizing a crane lift having such rope. A rope or belt or the like would affect the accuracy and speed of the system negatively and also requires more space due to sheaves and the like.

Figure 10C:
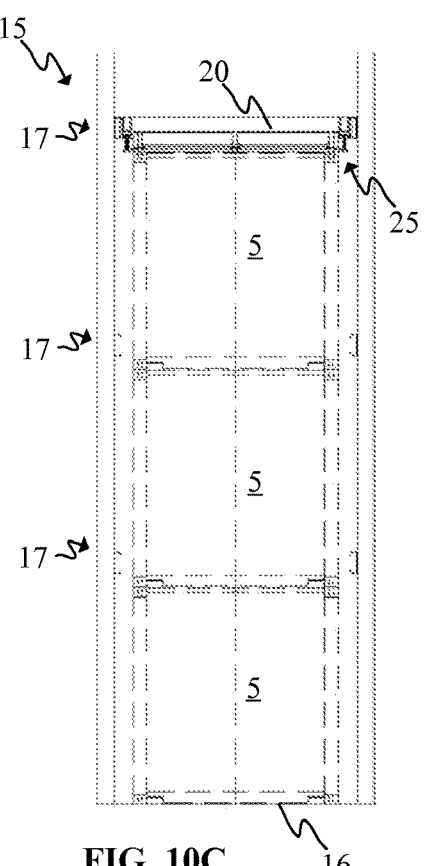
Figure 10D:
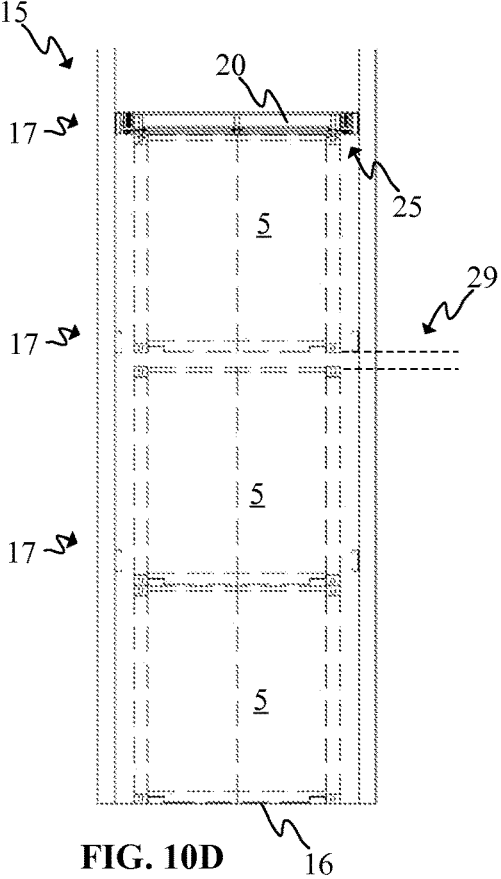

FIG. 10C illustrates the operation of the handling mechanism 25 when it is arranged to grip the container 5. The handling mechanism 25 is in the correct position for gripping, and it may be arranged to grip the container 5, such as by utilizing a spreader-type device or the like, from the gripping points thereof. In some embodiments, the handling mechanism 25 may comprise container twistlocks, including rotating element(s), or the like for gripping the container 5. FIG. 10D illustrates the operation of the handling mechanism 25 when it is arranged to lift the container 5. The handling mechanism 25 is being raised back towards the carrier device 20. FIG. 10D further illustrates how a gap 29 between the container 5 being handled and the container below, or in some cases the support 16, is provided. The gap 29 allows moving the container 5 away from the rack 15. The process may be reversed in order to move a container 5 into the rack 15 as can be understood by the skilled person.

Figures 11A, 11B, 11C:
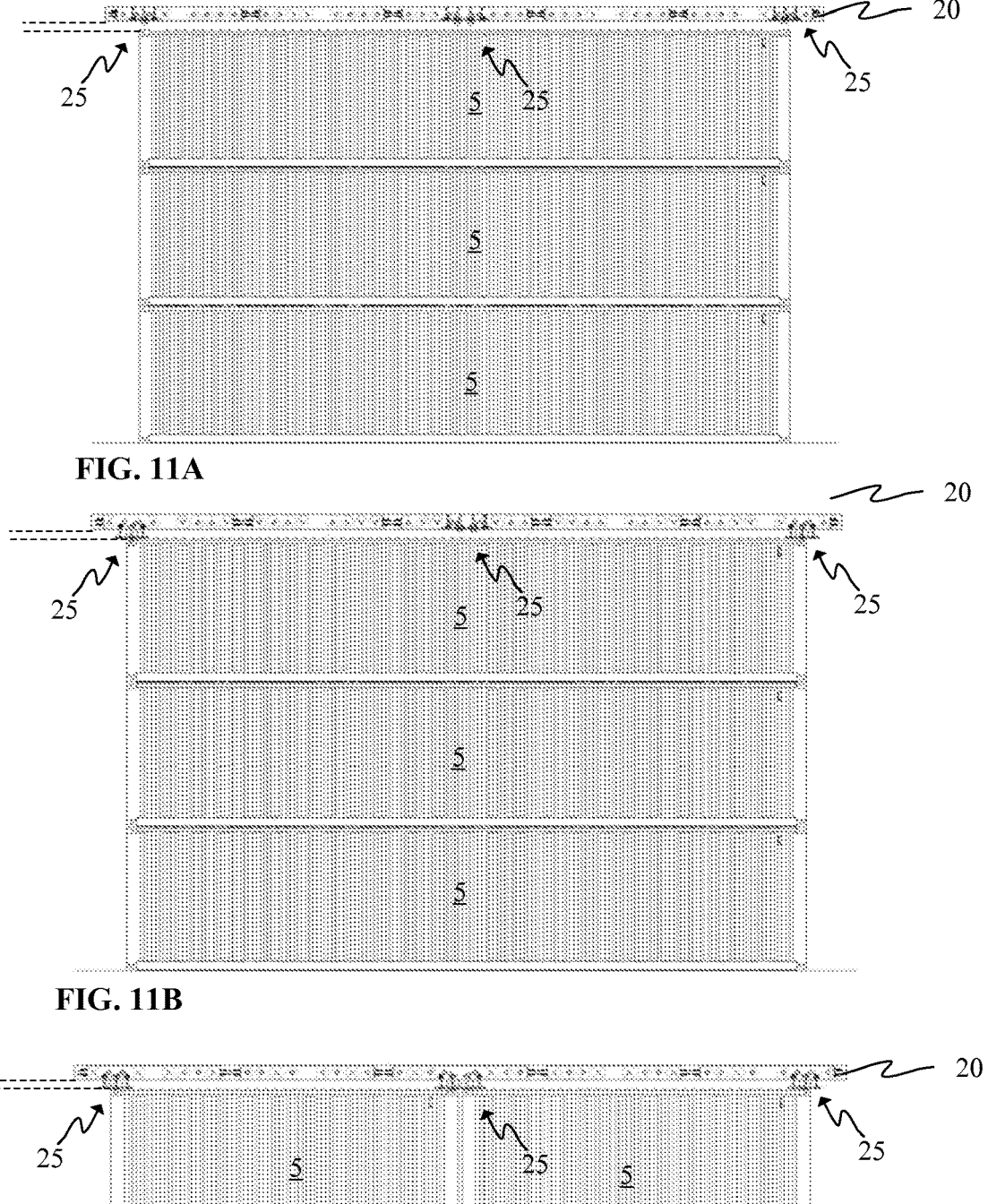
FIGS. 11A-11F show some operating phases of a container handling apparatus according to an embodiment.
Figure 11D:
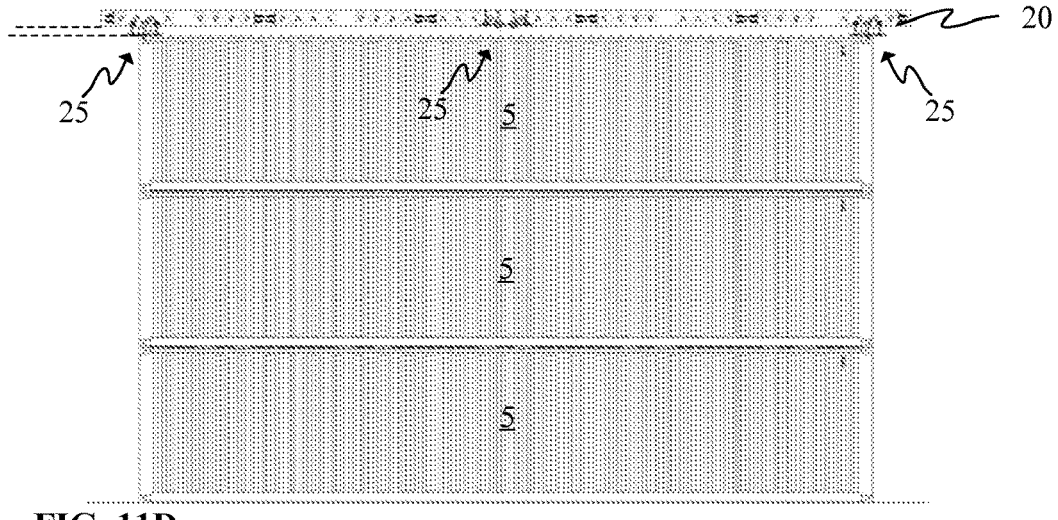
Figure 11E:
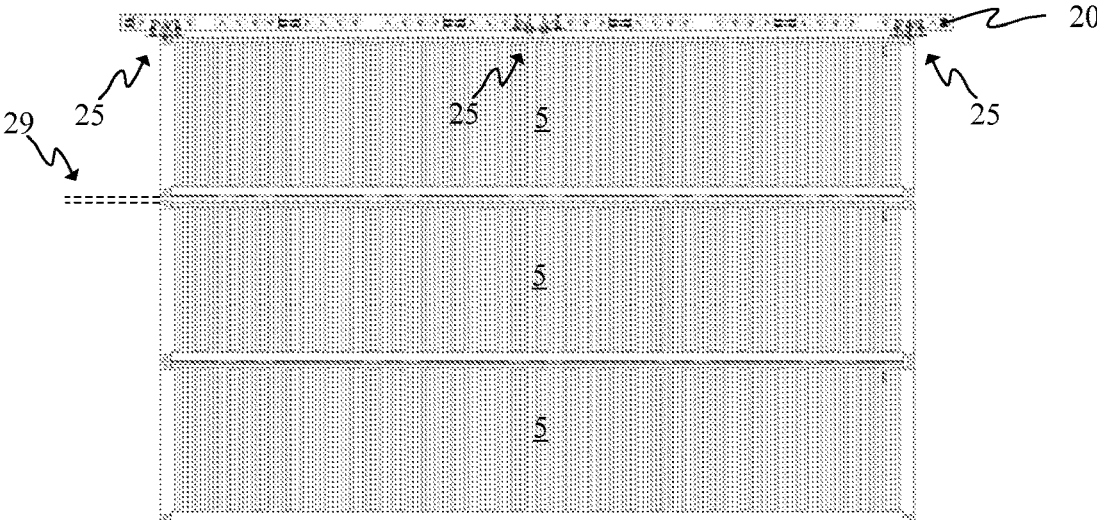
Figure 11F:
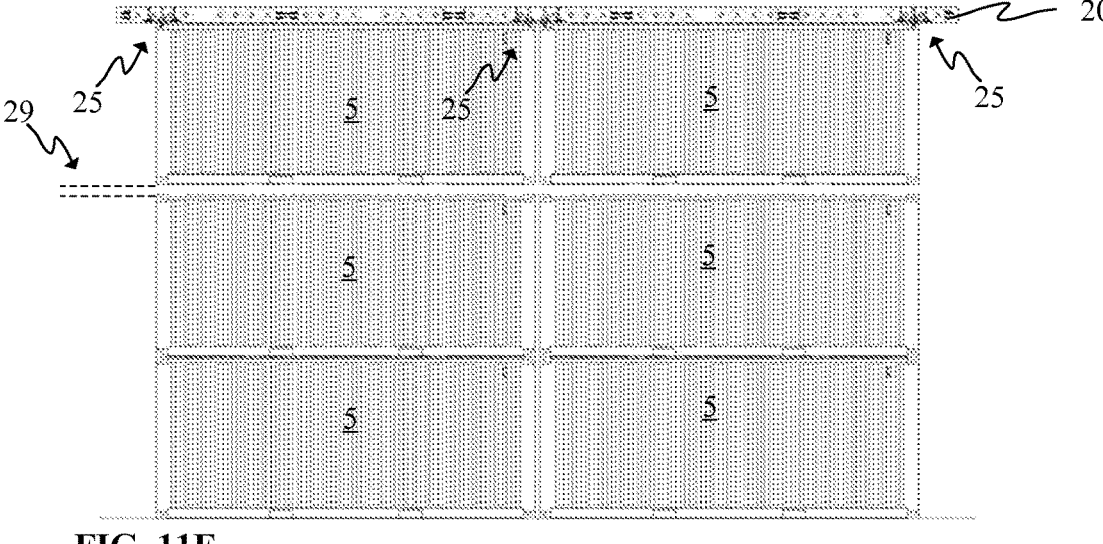

FIGS. 11A-11F show some operating phases of a container handling apparatus 10, especially the carrier device 20 thereof, according to an embodiment. The carrier device 20 according to the embodiment comprises a handling mechanism 25 which is capable of handling selectively either one longer, such as 40-foot, container 5, or one or two shorter, such as 20-foot, containers 5. As marked in FIGS. 11A-11F, there may be, in addition to the parts of the handling mechanism 25 in the ends of the carrier device further components in the middle part of the carrier device 20 as shown for handling shorter containers 5. Otherwise, the operating phases are similar to the ones illustrated in FIGS. 10A-10D. In FIG. 11A, the carrier device 20 is arranged to a position above the topmost container 5 in the rack 15 in question. In FIGS. 11B and 11C, the handling mechanism 25 is being lowered towards the container 5 to a position where gripping is possible. The lowering and lifting may be implemented by similar means as described hereinabove with respect to FIGS. 10A-10D. In FIG. 11D, the handling mechanism 25 is in the correct position for gripping, and it may be arranged to grip the container 5, such as by utilizing a spreader-type device, twistlocks, or the like, from the gripping points thereof. In FIGS. 11E and 11F, the handling mechanism 25 is being raised back towards the carrier device 20. FIGS. 11E and 11F further illustrates how the gap 29 between the container 5 being handled and the container 5 below, or in some cases the support 16, is provided. The gap 29 allows moving the container 5 away from the rack 15. The process may be reversed in order to move a container 5 into the rack 15 as can be understood by the skilled person.

The invention claimed is:

1. A multi-level container storage system comprising:
a storage module comprising racks in a vertical direction and a first horizontal direction for storing said containers, wherein each one of the racks comprises a support for supporting at least one said container and at least two pairs of first tracks extending in a second horizontal direction, the second horizontal direction being perpendicular relative to the first horizontal direction, wherein one said pair of the at least two pairs of first tracks is arranged at a first distance from another said pair of the at least two first tracks in the vertical direction, wherein the at least two pairs of first tracks are arranged between the supports of adjacent said racks in the vertical direction, thereby allowing one of the racks to receive a plurality of the containers positioned vertically with respect to each other; and a container handling apparatus capable of moving at least one said container in the vertical, the first horizontal, and the second horizontal directions, wherein the container handling apparatus comprises:
a stacker crane comprising a carrier support for a carrier device of the container handling apparatus and is arranged to be moved in the first horizontal direction and capable of moving the carrier support in the vertical direction, and
the carrier device comprising a handling mechanism for gripping, lifting, lowering, and releasing at least one said container, wherein the carrier device is arranged to be moved between the stacker crane and a selected one of the racks of the storage module, the carrier device being supported by one said pair of the at least two pairs of first tracks of the selected rack when the carrier device is within the selected rack, wherein the handling mechanism is arranged to move at least one said container at most the first distance in the vertical direction when lowering or lifting the container.

2. The multi-level container storage system of claim 1, wherein at least one of the racks is arranged to store consecutively at least two said containers in the second horizontal direction.

3. The multi-level container storage system of claim 2, comprising a further storage module arranged on an opposite side of the stacker crane in the second horizontal direction.

4. The multi-level container storage system of claim 1, wherein the carrier device is arranged to move at least one said container into and out of the storage module in a longitudinal direction of the at least one container.

5. The multi-level container storage system of claim 1, wherein the handling mechanism is rigid.

6. The multi-level container storage system of claim 1, wherein the first distance is equal to or greater than a height of a said container.

7. The multi-level container storage system of claim 1, wherein the support and a lowest pair of the at least two pairs of first tracks in the vertical direction is arranged to have a second distance therebetween, the second distance being equal to or greater than a height of a said container.

8. The multi-level container storage system of claim 1, wherein the handling mechanism is arranged to move at least one said container at most a half of the first distance.

9. The multi-level container storage system of claim 1, wherein the stacker crane is arranged to be moved in the first horizontal direction along a second track extending the first horizontal direction.

10. The multi-level container storage system of claim 1, wherein the stacker crane is arranged to move the carrier support in the vertical direction along vertical beams of the stacker crane.

11. The multi-level container storage system of claim 9, further comprising a loading/unloading facility, wherein the container handling apparatus is further arranged to be moved into the loading/unloading facility for retrieving a said container from the loading/unloading facility.

12. The multi-level container storage system of claim 11, wherein the second track extends into the loading/unloading facility.

13. The multi-level container storage system of claim 1, wherein the racks are dimensioned for storing one or more said containers having a length of about 6.1 meters, about 12.2 meters, about 14.6 meters, or about 16.2 meters.

14. A high-bay container storage comprising at least one said multi-level container storage system of claim 1, and at least one building element at least partly surrounding the at least one multi-level container storage system.

15. The multi-level container storage system of claim 3, comprising a further storage module arranged on an opposite side of the stacker crane in the second horizontal direction.

16. The multi-level container storage system of claim 2, wherein the carrier device is arranged to move at least one said container into and out of the storage module in a longitudinal direction of the at least one container.

17. The multi-level container storage system of claim 3, wherein the carrier device is arranged to move at least one said container into and out of the storage module in a longitudinal direction of the at least one container.

18. The multi-level container storage system of claim 3, wherein the carrier device is arranged to move at least one said container into and out of the storage module in a longitudinal direction of the at least one container.

19. The multi-level container storage system of claim 2, wherein the handling mechanism is rigid.

* * * * *